United States Patent [19]

Itakura et al.

[11] Patent Number: 4,616,289
[45] Date of Patent: Oct. 7, 1986

[54] CERAMIC HIGH DIELECTRIC COMPOSITION

[75] Inventors: Gen Itakura, Hirakata; Tadayoshi Ushijima, Kadoma; Kenji Kusakabe, Katano; Takayuki Kuroda, Nishinomiya, all of Japan

[73] Assignee: Matsushita Electric Industrial Co., Ltd., Osaka, Japan

[21] Appl. No.: 746,011

[22] PCT Filed: Dec. 20, 1982

[86] PCT No.: PCT/JP82/00472

§ 371 Date: Aug. 17, 1983

§ 102(e) Date: Aug. 17, 1983

[87] PCT Pub. No.: WO83/02270

PCT Pub. Date: Jul. 7, 1983

Related U.S. Application Data

[63] Continuation of Ser. No. 537,365, Aug. 17, 1983, abandoned.

[30] Foreign Application Priority Data

Dec. 21, 1981 [JP] Japan .................. 56-206573[U]
Dec. 21, 1981 [JP] Japan .................. 56-206574[U]
Dec. 21, 1981 [JP] Japan .................. 56-206575[U]
Feb. 17, 1982 [JP] Japan .................... 57-24965[U]

[51] Int. Cl.$^4$ .................... C04B 35/46; H01G 4/12
[52] U.S. Cl. ............................ 361/321; 361/320; 501/137; 501/138; 501/139
[58] Field of Search .............. 501/137, 139, 138; 361/320, 321

[56] References Cited

U.S. PATENT DOCUMENTS

| Re. 29,484 | 11/1977 | Utsumi et al. | 501/139 |
| 3,268,783 | 8/1966 | Saburi | 501/139 |
| 3,490,927 | 1/1970 | Kahn et al. | 501/137 |
| 3,753,911 | 8/1973 | Walker et al. | 501/139 |
| 4,014,707 | 3/1977 | Tanaka et al. | 501/139 |
| 4,073,989 | 2/1978 | Wainer | 428/131 |
| 4,096,098 | 6/1978 | Umeya et al. | 501/137 |
| 4,222,783 | 9/1980 | Atsumi et al. | 501/139 |
| 4,275,521 | 6/1981 | Gerstenberger et al. | 42/84 |
| 4,403,236 | 9/1983 | Mandai et al. | 357/61 |
| 4,468,472 | 8/1984 | Kashima et al. | 501/139 |
| 4,525,767 | 6/1985 | Alexander | 501/139 |

FOREIGN PATENT DOCUMENTS

| 51-69198 | 6/1976 | Japan | 501/139 |
| 51-149599 | 12/1976 | Japan | |
| 52-70399 | 6/1977 | Japan | 501/137 |
| 52-72499 | 6/1977 | Japan | 501/137 |
| 55-53006 | 4/1980 | Japan | |

Primary Examiner—Helen M. McCarthy
Attorney, Agent, or Firm—Cushman, Darby & Cushman

[57] ABSTRACT

This invention relates to ceramic high dielectric composition with $BaTiO_3$ as host component; and by containing 1–5 weight part of $CaTiO_3$ and 2–3 weight parts of $Ta_2O_5$ to 100 weight parts of the $BaTiO_3$, a composition having dielectric constant of 3000 or above, a small voltage dependency, a large bending strength and good high frequency characteristic is provided; and it has a good characteristic when used as thin film type dielectric body like laminated ceramic capacitor.

9 Claims, 9 Drawing Figures

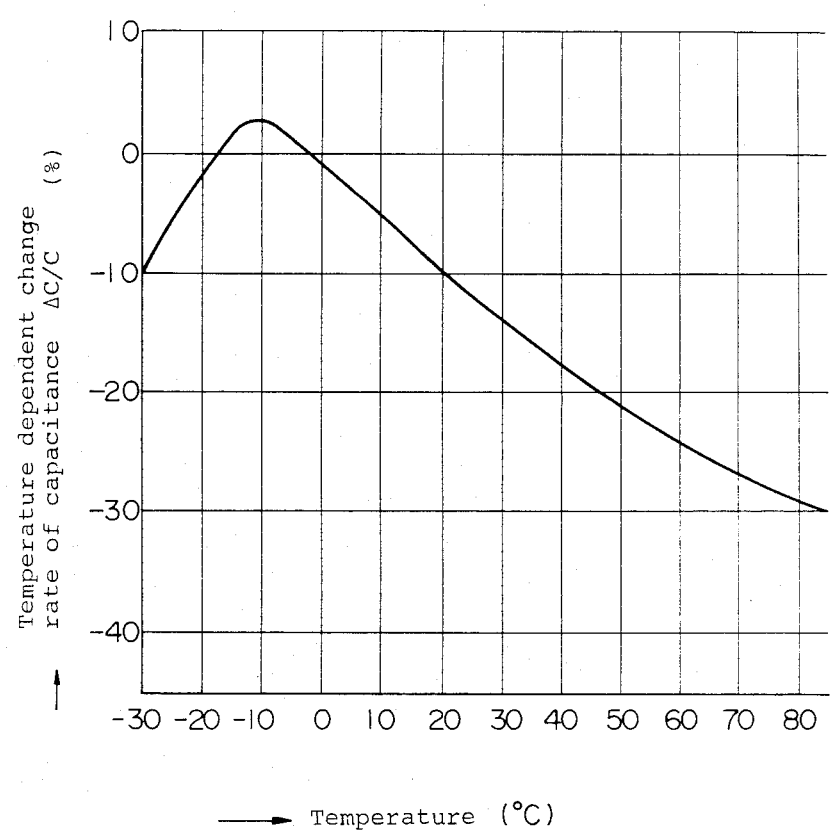
F I G. 7

CERAMIC HIGH DIELECTRIC COMPOSITION

This is a continuation of application Ser. No. 537,365, filed Aug. 17, 1983, abandoned.

DESCRIPTION

TECHNICAL FIELD

The present invention relates to ceramic high dielectric composition to be used mainly as laminated ceramic capacitor.

BACKGROUND ART

Hitherto many proposals have been made on ceramic high dielectric compositions with barium titanate (BaTiO$_3$) as host material, and they have been used specially for disc type ceramic capacitors.

The barium titanate is a material having ferrodielectric characteristic, and its Curie point lies around 120° C. Demarcated by this 120° C., in the lower temperature side thereof it becomes tetragonal, and in the upper temperature side thereof it becomes cubic. And it is well known that in the tetragonal region it shows ferrodielectric characteristics and in the cubic region it shows paraelectric characteristics.

Since a ceramic material consisting solely of barium titanate has a very large change of dielectric constant dependent on temperature and also has a large dielectric dissipation tan δ in a temperature range of about normal temperature, it is seldom used as capacitor by itself and hitherto devices have been made to shift the Curie point to around the normal temperature and to decrease the temperature dependency by adding various additives. CaTiO$_3$, BaZrO$_3$, SrTiO$_3$, BaSnO$_3$ and etc. are known as representative of the additives. By adding these appropriately and by adjusting with a small amount of composition, materials having characteristics of X7R, Y5T, Y5V, Z4V and etc. of EIA (Electric Industries Association) standard are offered. The fact is that these materials have been hitherto utilized generally as ceramic capacitors of the thick disc type, for instance having 0.5–1 mm thickness of element.

During these years, miniaturization of capacitors is progressing corresponding to miniaturization of various electronics-related components, and the most in laminated ceramic capacitors. The laminated layer ceramic capacitor is one in which ceramic dielectric body is made into thin film of around 25–100 μm and is sandwiching comb type electrodes to form a multiple layer structure. And since the ratio of the electrodes area to the electrodes gap can be made very large, its capacitance per volume can be made as large as 100 times or larger in comparison with the ceramic disc type capacitor, and the same capacitance can be assured with a volume as small as 1/10 or less, and therefore much miniaturization is easy.

When such a ceramic dielectric thin film is used, however, it is the fact that conventional disc type ceramic composition can not be used as it is. That is, since a voltage per unit length is loaded 10 times or more than the conventional case, a material having small voltage-dependencies of ceramic dielectric constant and small dissipation factor have become to be needed. Besides, due to a recent adoption of direct bonding system onto printed circuit board, such a strong material as is not destroyed by bending of the printed circuit board is needed. Further, since in electronics tuner or the like using the laminated ceramic capacitors, the frequencies are shifting to higher band of high sensitivities, those having good high frequency characteristics become necessary also with regard to the laminated ceramic capacitors. Especially, those having the characteristic of YD in JIS (Japanese Industrial standard) or the characteristic of Y5T in EIA standard are requested by a large number of users in relation to an electronic tuner, and those which have a dielectric constant of 3000 or above and tan δ of 2.0% or lower and low equivalent series resistance at a frequency band of 1–100 MHz are requested.

DISCLOSURE OF THE INVENTION

Accordingly, the present invention is to provide ceramic high dielectric composition with good high frequency characteristics, having dielectric constant of 3000 or above, small voltage dependency, large bending strength and good high frequency characteristics, by containing as additive 1–5 weight parts of CaTiO$_3$ and 2–3 weight parts of Ta$_2$O$_5$ to 100 weight parts of BaTiO$_3$.

BRIEF EXPLANATION OF THE DRAWING

FIG. 6 to FIG. 9 are graphs showing temperature dependent change rates of the same.

THE BEST MODE FOR CARRYING OUT THE INVENTION

Figure 1:
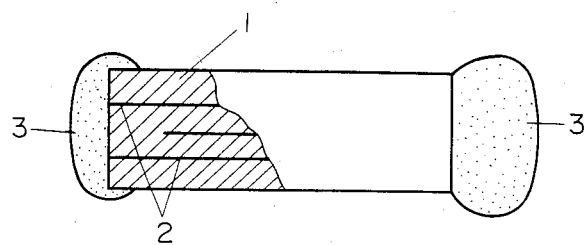
FIG. 1 is a partially sectional front view of a multiple layer ceramic capacitor made using the composition of the present invention.

As a result of accumulation of various experiments, the inventors propose a ceramic high dielectric composition having barium titanate (BaTiO$_3$) as the host material and additives of calcium titanate (CaTiO$_3$) and tantalum oxide (Ta$_2$O$_5$), and depending on necessity small amount of additive(s), and thereby being of a different group from the conventional compositions, and the present invention is hereafter elucidated with reference to the following embodiments.

Firstly, to 100 weight parts of BaTiO$_3$ (of 98% or higher purity), various additives are added and sufficiently mixed in a ball mill. The mixture is added with a small amount of 5% aqueous solution of PVA (polyvinylalcohol), then blended in a mortar and filtered through a 30 mesh sieve to be granulated. The granulated powder is put in a die having an inner diameter of 13 mm and molded in a shape of 13 mm in diameter and 0.5 mm in thickness by application of a pressure of 1 ton/cm$^2$. Also in the similar way, a mold of 4.7 mm × 12.5 mm × 1.5 mm size is formed by means of a rectangle die of 4.7 mm × 12.5 mm size. These molds are sintered at 1250°–1400° C. for 1–5 hours. Then, on both faces of the disc-shaped sintered body silver electrodes are provided. The below-mentioned Table 1 shows the characteristics of the sintered body obtained by means of various compositions of CaTiO$_3$, Ta$_2$O$_5$, MnO$_2$, CeO$_2$ and SiO$_2$ per 100 weight parts of BaTiO$_3$. In the table, $\epsilon_{25}$ shows dielectric constant obtained from capacitance measured at 25° C. with 1 KHz AC 1 V and tan δ measured under an AC voltage of effective value 50 V/mm. Further, TC shows change rate of capacitance measured at −30° C. and +85° C. taking 20° C. as reference. The baking condition for the above case was 1350° C. for 2 hours.

ceramic dielectric body consisting of the compound of sample No. 15, 2 palladium electrodes, and 3 electrodes

TABLE 1

| Sample No. | Additive composition (weight parts) | | | | | $\epsilon_{25}$ | tan δ (%) | IR (Ω-cm) | BDV (kV/mm) | AC − V (%) | TC (%) | | Constant of bending strength (Kg/cm²) |
|---|---|---|---|---|---|---|---|---|---|---|---|---|---|
| | CaTiO$_3$ | Ta$_2$O$_5$ | MnO$_2$ | CeO$_2$ | SiO$_2$ | | | | | | −30° C. | +85° C. | |
| *1 | 0 | 2.5 | 0.2 | 0.2 | 0 | 2627 | 1.1 | 3 × 10$^{13}$ | 14 | 5.8 | −5.7 | −28.5 | 1030 |
| 2 | 2.0 | 2.0 | 0.2 | 0.2 | 0 | 3453 | 0.9 | 7 × 10$^{13}$ | 19 | 1.3 | −10.3 | −29.1 | 1140 |
| 3 | 2.5 | 3.0 | 0.2 | 0.2 | 0 | 3568 | 0.8 | 5 × 10$^{13}$ | 17 | 1.5 | −4.8 | −33.1 | 950 |
| 4 | 3.0 | 2.5 | 0.2 | 0.1 | 0 | 3673 | 1.1 | 4 × 10$^{13}$ | 25 | 1.1 | −2.5 | −31.6 | 980 |
| 5 | 3.0 | 2.0 | 0.2 | 0.1 | 0 | 3322 | 0.9 | 6 × 10$^{13}$ | 19 | 1.2 | −3.7 | −33.5 | 1100 |
| 6 | 3.0 | 2.0 | 0.2 | 0 | 0 | 3438 | 0.7 | 8 × 10$^{13}$ | 17 | 0.9 | −2.6 | −32.5 | 1280 |
| 7 | 5.0 | 4.0 | 0 | 0.3 | 0 | 3128 | 0.5 | 8 × 10$^{13}$ | 14 | 0.9 | −1.8 | −31.6 | 1000 |
| *8 | 7.0 | 2.5 | 0.2 | 0.2 | 0 | 2217 | 0.6 | 3 × 10$^{14}$ | 25 | 0.7 | +1.3 | −41.1 | 1020 |
| *9 | 3.0 | 5.0 | 0.2 | 0.2 | 0 | 2136 | 0.8 | 6 × 10$^{13}$ | 28 | 3.1 | +5.6 | −50.3 | 620 |
| 10 | 3.0 | 1.0 | 0.2 | 0.2 | 0 | 3683 | 1.1 | 5 × 10$^{13}$ | 16 | 2.0 | −11.7 | −26.6 | 1200 |
| 11 | 3.0 | 2.5 | 0.2 | 0.3 | 0 | 3432 | 0.7 | 8 × 10$^{13}$ | 16 | 1.4 | −8.4 | −27.8 | 690 |
| *12 | 3.0 | 2.5 | 0.2 | 0.5 | 0 | 3588 | 0.9 | 6 × 10$^{13}$ | 17 | 3.9 | −3.3 | −27.3 | 550 |
| *13 | 3.0 | 2.5 | 0.5 | 0.2 | 0 | 3716 | 1.6 | 1 × 10$^{17}$ | 13 | 4.9 | −5.5 | −30.8 | 990 |
| *14 | 3.0 | 2.5 | 0.8 | 0.2 | 0 | 3523 | 1.8 | 3 × 10$^{12}$ | 8 | 5.7 | −6.2 | −37.4 | 1050 |
| 15 | 3.0 | 2.5 | 0.2 | 0.2 | 0.5 | 3401 | 0.7 | 2 × 10$^{14}$ | 21 | 0.9 | −7.1 | −32.6 | 1420 |
| 16 | 3.0 | 2.5 | 0 | 0 | 0.5 | 3267 | 0.9 | 3 × 10$^{14}$ | 24 | 0.7 | −5.9 | −28.9 | 1330 |
| *17 | 3.0 | 2.0 | 0 | 0 | 1.0 | 2908 | 2.3 | 2 × 10$^{13}$ | 13 | 3.8 | −7.1 | −31.8 | 480 |
| 18 | 3.0 | 2.0 | 0 | 0 | 0 | 3482 | 0.8 | 4 × 10$^{13}$ | 15 | 1.6 | −3.1 | −32.7 | 890 |
| 19 | 3.0 | 3.0 | 0 | 0 | 0 | 3269 | 0.5 | 6 × 10$^{13}$ | 16 | 1.1 | −4.9 | −30.8 | 830 |
| *20 | 0.5 | 2.5 | 0 | 0 | 0 | 3990 | 1.8 | 2 × 10$^{13}$ | 11 | 4.7 | −7.2 | −37.3 | 680 |
| 21 | 1.0 | 2.5 | 0 | 0 | 0 | 3720 | 1.1 | 7 × 10$^{13}$ | 19 | 1.9 | −5.7 | −33.0 | 850 |
| 22 | 3.0 | 2.5 | 0 | 0 | 0 | 3570 | 0.6 | 6 × 10$^{13}$ | 17 | 1.5 | −3.9 | −31.7 | 1030 |
| 23 | 5.0 | 2.5 | 0 | 0 | 0 | 3160 | 0.3 | 1 × 10$^{14}$ | 13 | 2.0 | −3.7 | −29.8 | 990 |
| *24 | 7.0 | 2.5 | 0 | 0 | 0 | 2340 | 0.5 | 2 × 10$^{14}$ | 9 | 1.7 | −0.6 | −42.3 | 960 |
| 25 | 1.0 | 2.5 | 0.2 | 0.3 | 0 | 3447 | 0.9 | 5 × 10$^{13}$ | 14 | 1.4 | −5.5 | −32.6 | 1210 |
| 26 | 5.0 | 3.0 | 0.2 | 0 | 0.5 | 3456 | 1.2 | 9 × 10$^{13}$ | 17 | 1.8 | −4.3 | −28.6 | 900 |
| *27 | 7.0 | 3.5 | 0.3 | 0 | 1.0 | 2050 | 0.4 | 1.1 × 10$^{14}$ | 12 | 1.4 | +1.0 | −39.3 | 810 |
| *28 | 3.0 | 1.0 | 0 | 0 | 0.5 | 3148 | 0.8 | 1 × 10$^{13}$ | 12 | 4.1 | −13.6 | −21.4 | 1090 |
| 29 | 3.0 | 2.0 | 0 | 0 | 0.5 | 3306 | 0.7 | 9 × 10$^{13}$ | 16 | 1.5 | −4.3 | −30.8 | 1120 |
| 30 | 3.0 | 3.0 | 0 | 0 | 0.5 | 3362 | 0.7 | 7 × 10$^{13}$ | 16 | 1.5 | −2.1 | −32.7 | 1160 |
| *31 | 3.0 | 4.0 | 0 | 0 | 0.5 | 3433 | 0.4 | 8 × 10$^{13}$ | 19 | 1.2 | +1.3 | −36.8 | 1240 |

(*marked are comparison samples, which are outside the scope of the present invention. And the additive composition shows additive amount to 100 weight parts of BaTiO$_3$.)

As is obvious from Table 1, it is observed that the composition of the present invention is small in capacity change under AC voltage, and strong in bending strength. Since in the conventional composition with the addition of BaZrO$_3$, BaSnO$_3$ or SrTiO$_3$ the AC voltage characteristic in tan δ value under 50 V/mm has been as high as about 3–7 and bending strength has been as low as 600–700 Kg/cm², they are considered very satisfactory characteristics.

Figure 2:
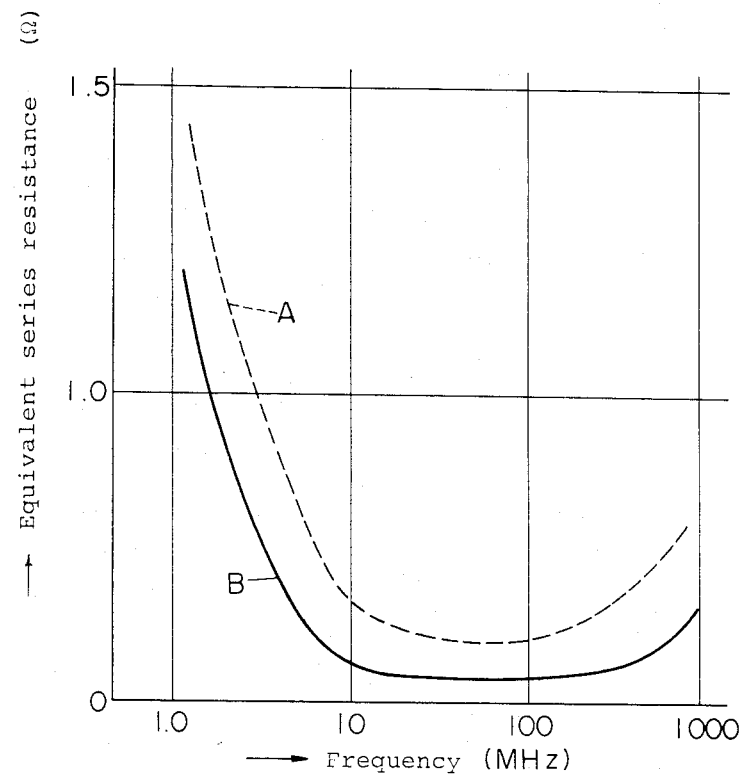
FIG. 2–FIG. 5 are graphs showing frequency characteristics of equivalent series resistance of the laminated ceramic capacitor.

Table 2 shows the results of characteristics obtained by sample laminated ceramic capacitors like the one as shown in FIG. 1 by using the composition of the sample No. 15 of the Table 1, and then examining the characteristics. FIG. 2 also shows characteristics of capacitors trially made by using a conventional representative composition prepared by adding 3 weight parts of BaZrO$_3$, 0.4 weight part of MgTiO$_3$ and 0.2 weight parts of MnO$_2$ to 100 weight parts of BaTiO$_3$. In this case, the dimension of the element is 3.07 mm × 1.56 mm × 0.56 mm. Incidentally in FIG. 1, numeral 1 designates the (Ag electrodes). In Table 2, C and tan δ are values measured with 1 KHz AC 1 V, IRe is the insulation resistivity measured with DC 50 V, and BDVe is rising breakdown voltage. The bending strength is the pressure immediately before destruction of element when the element is held with 2.5 mm span and center part of the element is pressed with a knife of 0.5 mm thick edge.

TABLE 2

| | C (pF) | tan δ (%) | I Re (Ω) | B D Ve (kV) | TC (%) | | Bending Strength (Kg) |
|---|---|---|---|---|---|---|---|
| | | | | | −30° C. | +85° C. | |
| Composition of the present invention (No. 15) | 2460 | 0.8 | 1.3 × 10$^{13}$ | 2.5 | −1.6 | −30.9 | 3.2 |
| Conventional composition group with additive of BaZrO$_3$ | 2320 | 2.8 | 2 × 10$^{12}$ | 1.6 | +1.3 | −31.2 | 1.8 |

Figure 6:
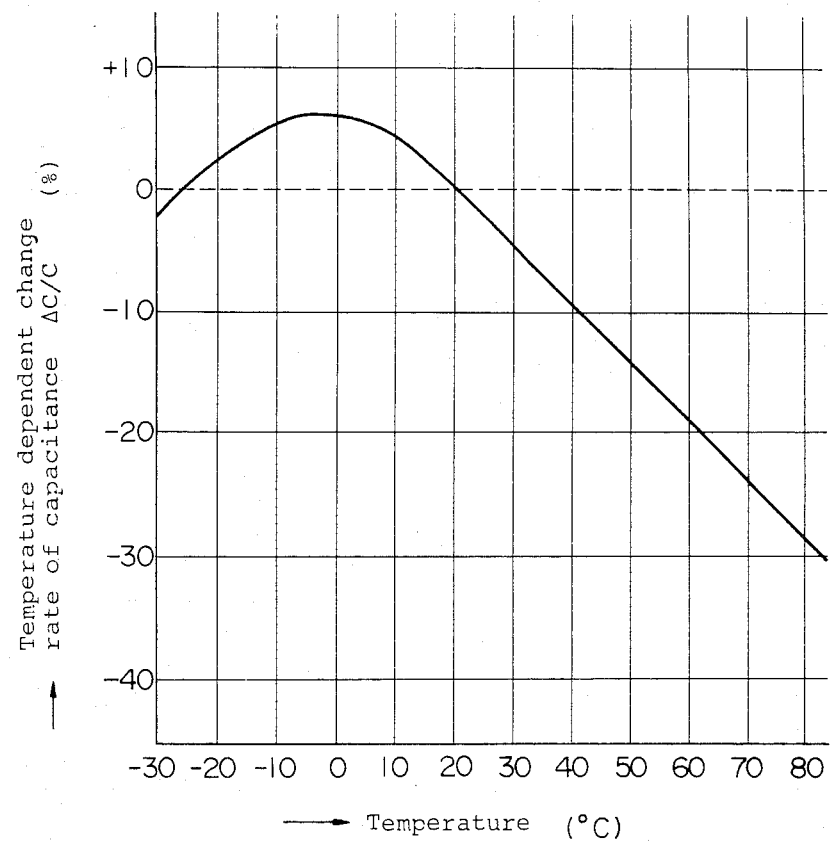

FIG. 2 shows frequency characteristic of equivalent series resistance of this case. It is clear that as compared with characteristic A of the capacitor according to the conventional composition, characteristic B of the capacitor of the present invention trially made by the sample No. 15 has a very good characteristic in the high frequency range. FIG. 6 shows the temperature change rate of the same capacitor trially made by the present invention.

Also included is a second embodiment of the present invention, wherein $BaTiO_3$ is the host material and $CaTiO_3$, $Ta_2O_5$ and besides, gadolinium oxide ($Gd_2O_3$) are added to it. This is a ceramic high dielectric composition formed by adding 1-5 weight parts of $CaTiO_3$, 1-4 weight parts of $Ta_2O_5$ and 1-4 weight parts of $Gd_2O_3$ to 100 weight parts of $BaTiO_3$. In this case, 0.01-0.5% by weight of at least one kind of oxides of Mn, Cr, Fe, Ni and Co to the host material may be included.

The below-mentioned Table 3 shows the characteristics of sintered bodies obtained for the various additive compositions in the second embodiments; and the condition of preparation is quite the same as that of the embodiments of the above-mentioned first embodiment and the characteristics are measured in the same conditions.

are added to it, and a fourth embodiment of the present invention wherein $BaTiO_3$ is a host material and $CaTiO_3$, $Ta_2O_5$ and further lanthanum oxide ($La_2O_3$) are added to it. That is, these are ceramic high dielectric compositions formed by adding 1-5 weight parts of $CaTiO_3$, 1-4 weight parts of $Ta_2O_5$ and 1-4 weight parts of $Nd_2O_3$ to 100 weight parts of $BaTiO_3$, and a ceramic high dielectric composition formed by adding 1-5 weight parts of $CaTiO_3$, 1-4 weight parts of $Ta_2O_5$ and 1-4 weight parts of $La_2O_3$ to 100 weight parts of $BaTiO_3$. Also in these cases, 0.01-0.5% by weight of at least one kind of oxide of Mn, Cr, Fe, Ni and Co to the host material may be contained.

The below-mentioned Table 4 and Table 5 show characteristics of sintered bodies obtained for the various additive compositions in the third and fourth embodiments; and the conditions are quite the same as that

TABLE 3

| Sample No. | Additive composition (weight parts) | | | | $\epsilon_{25}$ | tan δ (%) | IR (Ω-cm) | BDV (kV/mm) | AC − V (%) | TC (%) | | Constant of bending strength (Kg/cm²) |
|---|---|---|---|---|---|---|---|---|---|---|---|---|
| | $CaTiO_3$ | $Ta_2O_5$ | $Gd_2O_3$ | Other | | | | | | −30° C. | +85° C. | |
| *1 | 0 | 2.5 | 2.0 | — | 3651 | 1.1 | 5 × 10¹³ | 10 | 3.8 | −17 | −53 | 860 |
| 2 | 2.5 | 2.0 | 2.0 | — | 3359 | 0.7 | 7 × 10¹³ | 15 | 1.3 | −10 | −25 | 1151 |
| 3 | 2.0 | 4.0 | 2.0 | — | 3963 | 1.3 | 9 × 10¹³ | 17 | 2.0 | −10 | −30 | 975 |
| 4 | 2.0 | 4.0 | 4.0 | — | 4254 | 1.2 | 2 × 10¹³ | 17 | 1.9 | −13 | −25 | 875 |
| 5 | 5.0 | 3.0 | 1.0 | — | 3005 | 1.3 | 1 × 10¹³ | 19 | 2.0 | −6 | −35 | 950 |
| *6 | 7.0 | 2.5 | 2.0 | — | 1715 | 0.4 | 7 × 10¹³ | 20 | 0.9 | 0 | −20 | 1040 |
| *7 | 3.0 | 0 | 4.0 | — | | | Not be sintered | | | | | |
| 8 | 2.0 | 1.0 | 4.0 | — | 3523 | 0.9 | 2 × 10¹⁴ | 17 | 1.9 | −3 | −39 | 995 |
| 9 | 2.3 | 3.0 | 1.0 | — | 4051 | 0.8 | 3 × 10¹³ | 20 | 1.6 | −5 | −20 | 900 |
| *10 | 2.5 | 2.5 | 0 | — | 4240 | 2.5 | 4 × 10¹³ | 23 | 4.9 | −15 | −30 | 430 |
| *11 | 2.5 | 4.0 | 5.0 | — | 3561 | 1.2 | 9 × 10¹³ | 17 | 2.0 | 50 | −5 | 540 |
| *12 | 2.5 | 7.0 | 2.5 | — | 1241 | 0.7 | 1 × 10¹³ | 19 | 1.0 | 75 | 35 | 700 |
| 13 | 4.0 | 1.0 | 4.0 | — | 3334 | 1.4 | 3 × 10¹³ | 16 | 2.2 | −12 | −36 | 1150 |
| 14 | 1.0 | 4.0 | 4.0 | — | 4500 | 1.3 | 8 × 10¹³ | 17 | 2.1 | −15 | −21 | 980 |
| 15 | 2.0 | 2.0 | 2.0 | $MnO_2$ 0.2 | 3796 | 0.6 | 4 × 10¹⁴ | 23 | 0.9 | −14 | −39 | 1150 |
| 16 | 2.0 | 2.0 | 2.0 | $MnO_2$ 0.5 | 3125 | 0.8 | 8 × 10¹³ | 22 | 1.0 | −7 | −30 | 1240 |
| *17 | 2.0 | 2.0 | 2.0 | $MnO_2$ 0.7 | 1115 | 0.3 | 9 × 10¹³ | 23 | 0.7 | −10 | −35 | 1200 |
| 18 | 2.0 | 2.0 | 2.0 | $Cr_2O_3$ 0.1 | 3951 | 1.1 | 4 × 10¹³ | 21 | 2.0 | −15 | −31 | 1090 |
| 19 | 2.0 | 2.0 | 2.0 | $Cr_2O_3$ 0.3 | 3951 | 0.7 | 7 × 10¹³ | 19 | 1.1 | −11 | −43 | 1040 |
| 20 | 2.0 | 2.0 | 2.0 | $Cr_2O_3$ 0.5 | 3743 | 0.8 | 2 × 10¹³ | 20 | 1.2 | −15 | −35 | 1090 |
| *21 | 2.0 | 2.0 | 2.0 | $Cr_2O_3$ 0.7 | 1175 | 0.9 | 9 × 10¹³ | 18 | 1.4 | −19 | −22 | 950 |
| 22 | 2.0 | 2.0 | 2.0 | $Fe_2O_3$ 0.3 | 4333 | 1.2 | 1 × 10¹³ | 16 | 1.9 | −25 | −39 | 950 |
| 23 | 2.0 | 2.0 | 2.0 | $Fe_2O_3$ 0.5 | 3751 | 1.3 | 6 × 10¹³ | 15 | 2.0 | −15 | −38 | 1040 |
| *24 | 2.0 | 2.0 | 2.0 | $Fe_2O_3$ 0.7 | 3751 | 1.1 | 4 × 10¹³ | 17 | 1.9 | −22 | −35 | 730 |
| 25 | 2.0 | 2.0 | 2.0 | NiO 0.3 | 3591 | 0.9 | 5 × 10¹³ | 22 | 1.5 | −23 | −33 | 950 |
| 26 | 2.0 | 2.0 | 2.0 | NiO 0.5 | 3600 | 1.1 | 3 × 10¹³ | 23 | 1.8 | −7 | −30 | 980 |
| *27 | 2.0 | 2.0 | 2.0 | NiO 0.7 | 3951 | 2.5 | 2 × 10¹³ | 19 | 4.6 | −20 | −45 | 1120 |
| 28 | 2.0 | 2.0 | 2.0 | CoO 0.3 | 3541 | 1.3 | 9 × 10¹³ | 17 | 2.2 | −15 | −25 | 1040 |
| 29 | 2.0 | 2.0 | 2.0 | CoO 0.5 | 3325 | 1.0 | 4 × 10¹³ | 18 | 1.4 | −15 | −38 | 1000 |
| *30 | 2.0 | 2.0 | 2.0 | CoO 0.7 | 2743 | 1.8 | 1 × 10¹³ | 9 | 3.5 | −5 | −75 | 690 |

(*marked are comparison samples, which are outside the present invention. The additive compositions of $CaTiO_3$, $Ta_2O_5$ and $Gd_2O_3$ are shown by weight parts of the additives to 100 weight parts of $BaTiO_3$, and the others, $MnO_2$, $Cr_2O_3$ etc. are shown by added amount in weight % to host material.)

Nextly, elucidation is made of a third embodiment of the present invention wherein $BaTiO_3$ is a host material and $CaTiO_3$, $Ta_2O_5$ and further neodium oxide ($Nd_2O_3$)

of the embodiment of the above-mentioned first embodiment and the characteristics are measured under the same conditions.

TABLE 4

| Sample No. | Additive composition (weight parts) | | | | $\epsilon_{25}$ | tan δ (%) | IR (Ω-cm) | BDV (kV/mm) | AC − V (%) | TC (%) | | Constant of bending strength (Kg/cm²) |
|---|---|---|---|---|---|---|---|---|---|---|---|---|
| | $CaTiO_3$ | $Ta_2O_5$ | $Nd_2O_3$ | Other | | | | | | −30° C. | +85° C. | |
| *1 | 0 | 2.5 | 2.0 | — | 3795 | 1.1 | 5 × 10¹³ | 10 | 3.3 | −10 | −59 | 930 |
| 2 | 2.5 | 2.0 | 2.0 | — | 3458 | 0.7 | 7 × 10¹³ | 16 | 1.2 | −7 | −29 | 950 |
| 3 | 2.0 | 4.0 | 2.0 | — | 3750 | 0.8 | 6 × 10¹³ | 15 | 1.3 | −6 | −29 | 950 |
| 4 | 2.0 | 4.0 | 4.0 | — | 4315 | 1.1 | 2 × 10¹³ | 19 | 1.3 | −25 | −36 | 1050 |
| 5 | 5.0 | 3.0 | 1.0 | — | 3250 | 1.0 | 7 × 10¹³ | 19 | 1.7 | −72 | −33 | 1020 |
| *6 | 7.0 | 2.5 | 2.0 | — | 2000 | 0.6 | 1 × 10¹⁴ | 18 | 1.1 | −25 | −33 | 1140 |
| *7 | 3.0 | 0 | 4.0 | — | | | Not be sintered | | | | | |
| 8 | 2.0 | 1.0 | 4.0 | — | 3750 | 0.9 | 1.4 × 10¹⁴ | 17 | 1.1 | −5 | −35 | 950 |
| 9 | 2.0 | 3.0 | 1.0 | — | 3841 | 0.7 | 7 × 10¹³ | 19 | 1.7 | −22 | −32 | 1020 |
| *10 | 2.5 | 2.5 | 0 | — | 3594 | 1.2 | 4 × 10¹³ | 20 | 1.9 | −8 | −40 | 1040 |
| *11 | 2.5 | 4.0 | 5.0 | — | 3951 | 1.1 | 3 × 10¹³ | 15 | 1.9 | +53 | +5 | 550 |
| *12 | 2.5 | 7.0 | 2.5 | — | 1235 | 0.6 | 1 × 10¹³ | 17 | 1.4 | +85 | +23 | 640 |

TABLE 4-continued

| Sample No. | Additive composition (weight parts) | | | | $\epsilon_{25}$ | tan δ (%) | IR (Ω-cm) | BDV (kV/mm) | AC − V (%) | TC (%) −30° C. | TC (%) +85° C. | Constant of bending strength (Kg/cm²) |
|---|---|---|---|---|---|---|---|---|---|---|---|---|
| | CaTiO₃ | Ta₂O₅ | Nd₂O₃ | Other | | | | | | | | |
| 13 | 4.0 | 1.0 | 4.0 | — | 3674 | 0.7 | 9 × 10¹³ | 14 | 2.4 | −13 | −33 | 1150 |
| 14 | 1.0 | 4.0 | 1.0 | — | 4325 | 0.9 | 7 × 10¹³ | 18 | 2.1 | −7 | −43 | 1250 |
| 15 | 2.0 | 2.0 | 2.0 | MnO₂ 0.2 | 3895 | 0.8 | 8 × 10¹³ | 22 | 0.9 | −8 | −25 | 1120 |
| 16 | 2.0 | 2.0 | 2.0 | MnO₂ 0.5 | 3334 | 0.7 | 7 × 10¹³ | 21 | 0.8 | −5 | −33 | 750 |
| *17 | 2.0 | 2.0 | 2.0 | MnO₂ 0.7 | 1235 | 0.6 | 9 × 10¹³ | 23 | 0.9 | −10 | −34 | 980 |
| 18 | 2.0 | 2.0 | 2.0 | Cr₂O₃ 0.1 | 3965 | 1.0 | 4 × 10¹³ | 22 | 1.7 | −13 | −25 | 1150 |
| 19 | 2.0 | 2.0 | 2.0 | Cr₂O₃ 0.3 | 3951 | 0.7 | 5 × 10¹³ | 15 | 1.2 | −15 | −36 | 1000 |
| 20 | 2.0 | 2.0 | 2.0 | Cr₂O₃ 0.5 | 3454 | 0.9 | 7 × 10¹³ | 16 | 1.3 | −13 | −29 | 950 |
| *21 | 2.0 | 2.0 | 2.0 | Cr₂O₃ 0.7 | 1591 | 0.8 | 1 × 10¹⁴ | 20 | 1.2 | −11 | −31 | 960 |
| 22 | 2.0 | 2.0 | 2.0 | Fe₂O₃ 0.3 | 4051 | 1.0 | 9 × 10¹³ | 18 | 1.6 | −22 | −36 | 1020 |
| 23 | 2.0 | 2.0 | 2.0 | Fe₂O₃ 0.5 | 3850 | 1.0 | 8 × 10¹³ | 17 | 1.7 | −20 | −31 | 950 |
| *24 | 2.0 | 2.0 | 2.0 | Fe₂O₃ 0.7 | 3351 | 0.7 | 4 × 10¹³ | 19 | 1.1 | −10 | −40 | 750 |
| 25 | 2.0 | 2.0 | 2.0 | NiO 0.3 | 3431 | 0.4 | 7 × 10¹³ | 22 | 0.9 | −18 | −35 | 1040 |
| 26 | 2.0 | 2.0 | 2.0 | NiO 0.5 | 3651 | 0.8 | 1 × 10¹³ | 17 | 1.3 | −14 | −30 | 970 |
| *27 | 2.0 | 2.0 | 2.0 | NiO 0.7 | 3511 | 2.5 | 2 × 10¹³ | 19 | 4.6 | −5 | −21 | 1120 |
| 28 | 2.0 | 2.0 | 2.0 | CoO 0.3 | 3290 | 1.0 | 7 × 10¹³ | 18 | 1.7 | −17 | −38 | 1050 |
| 29 | 2.0 | 2.0 | 2.0 | CoO 0.5 | 3395 | 1.2 | 3 × 10¹³ | 16 | 1.9 | −19 | −39 | 980 |
| *30 | 2.0 | 2.0 | 2.0 | CoO 0.7 | 3433 | 1.5 | 1 × 10¹³ | 12 | 2.0 | −15 | −56 | 750 |

(*marked are comparison samples, which are outside the present invention. The additive compositions of CaTiO₃, Ta₂O₅ and Gd₂O₃ are shown by weight parts of the additives to 100 weight parts of BaTiO₃, and the others, MnO₂, Cr₂O₃ etc. are shown by added amount in weight % to host material.)

TABLE 5

| Sample No. | Additive composition (weight parts) | | | | $\epsilon_{25}$ | tan δ (%) | IR (Ω-cm) | BDV (kV/mm) | AC − V (%) | TC (%) −30° C. | TC (%) +85° C. | Constant of bending strength (Kg/cm²) |
|---|---|---|---|---|---|---|---|---|---|---|---|---|
| | CaTiO₃ | Ta₂O₅ | La₂O₃ | Other | | | | | | | | |
| *1 | 0 | 2.5 | 2.0 | — | 3493 | 0.97 | 4 × 10¹³ | 10 | 3.5 | −15 | −52 | 950 |
| 2 | 2.5 | 2.0 | 2.0 | — | 3215 | 0.7 | 5 × 10¹³ | 14 | 1.3 | −10 | −28.3 | 1050 |
| 3 | 2.0 | 4.0 | 2.0 | — | 3753 | 1.1 | 6 × 10¹³ | 18 | 1.5 | −4.3 | −30.5 | 980 |
| 4 | 2.0 | 4.0 | 4.0 | — | 4023 | 1.2 | 5 × 10¹³ | 17 | 1.7 | −15.2 | −26.1 | 850 |
| 5 | 5.0 | 3.0 | 1.0 | — | 3115 | 0.9 | 6 × 10¹³ | 19 | 1.1 | −3.1 | −35.1 | 1040 |
| *6 | 7.0 | 2.5 | 2.0 | — | 2115 | 0.6 | 9 × 10¹⁴ | 20 | 1.0 | −25.1 | −32.5 | 1020 |
| *7 | 3.0 | 0 | 4.0 | — | | | Not be sintered | | | | | |
| 8 | 2.0 | 1.0 | 4.0 | — | 3423 | 0.9 | 1.3 × 10¹⁴ | 18 | 1.1 | −3.8 | −40 | 980 |
| 9 | 2.0 | 3.0 | 1.0 | — | 3951 | 0.7 | 4 × 10¹³ | 19 | 1.7 | −15.3 | −29 | 970 |
| *10 | 2.5 | 2.5 | 0 | — | 4043 | 1.2 | 2 × 10¹³ | 15 | 1.4 | −7.5 | −33.1 | 540 |
| *11 | 2.5 | 4.0 | 5.0 | — | 4004 | 1.1 | 4 × 10¹³ | 11 | 2.5 | −47 | −3.5 | 750 |
| *12 | 2.5 | 7.0 | 2.5 | — | 1561 | 0.6 | 4 × 10¹⁴ | 19 | 1.0 | −95 | −3 | 630 |
| 13 | 4.0 | 1.0 | 4.0 | — | 3523 | 0.7 | 3 × 10¹³ | 14 | 1.2 | −8 | −36 | 1120 |
| 14 | 1.0 | 4.0 | 1.0 | — | 4231 | 0.9 | 5 × 10¹³ | 20 | 1.4 | −15 | −40 | 1040 |
| 15 | 2.0 | 2.0 | 2.0 | MnO₂ 0.2 | 3151 | 0.7 | 7 × 10¹³ | 21 | 0.9 | −8 | −25 | 1250 |
| 16 | 2.0 | 2.0 | 2.0 | MnO₂ 0.5 | 3050 | 0.6 | 4 × 10¹³ | 20 | 0.8 | −7 | −29 | 1150 |
| *17 | 2.0 | 2.0 | 2.0 | MnO₂ 0.7 | 1464 | 0.4 | 9 × 10¹³ | 23 | 0.7 | −7 | −29 | 1350 |
| 18 | 2.0 | 2.0 | 2.0 | Cr₂O₃ 0.1 | 4035 | 1.0 | 3 × 10¹³ | 22 | 1.2 | −10 | −31 | 1000 |
| 19 | 2.0 | 2.0 | 2.0 | Cr₂O₃ 0.3 | 3454 | 0.7 | 4 × 10¹³ | 18 | 1.1 | −20 | −40 | 1000 |
| 20 | 2.0 | 2.0 | 2.0 | Cr₂O₃ 0.5 | 3254 | 0.8 | 6 × 10¹³ | 18 | 1.1 | −18 | −35 | 1020 |
| *21 | 2.0 | 2.0 | 2.0 | Cr₂O₃ 0.7 | 1451 | 0.4 | 9 × 10¹³ | 23 | 1.2 | −11 | −31 | 1000 |
| 22 | 2.0 | 2.0 | 2.0 | Fe₂O₃ 0.3 | 3951 | 1.1 | 9 × 10¹³ | 17 | 2.0 | −22 | −39 | 950 |
| 23 | 2.0 | 2.0 | 2.0 | Fe₂O₃ 0.5 | 3850 | 1.0 | 7 × 10¹³ | 17 | 1.8 | −25 | −38 | 950 |
| *24 | 2.0 | 2.0 | 2.0 | Fe₂O₃ 0.7 | 3743 | 0.9 | 4 × 10¹³ | 18 | 1.7 | −23 | −37 | 750 |
| 25 | 2.0 | 2.0 | 2.0 | NiO 0.3 | 3431 | 0.8 | 3 × 10¹³ | 17 | 1.3 | −18 | −40 | 1050 |
| 26 | 2.0 | 2.0 | 2.0 | NiO 0.5 | 3596 | 1.2 | 5 × 10¹³ | 16 | 1.8 | −14 | −35 | 950 |
| *27 | 2.0 | 2.0 | 2.0 | NiO 0.7 | 3500 | 2.0 | 6 × 10¹³ | 18 | 4.0 | −7 | −30 | 980 |
| 28 | 2.0 | 2.0 | 2.0 | CoO 0.3 | 3215 | 1.0 | 9 × 10¹³ | 17 | 1.5 | −21 | −40 | 950 |
| 29 | 2.0 | 2.0 | 2.0 | CoO 0.5 | 3115 | 1.2 | 4 × 10¹³ | 15 | 1.7 | −15 | −42 | 950 |
| *30 | 2.0 | 2.0 | 2.0 | CoO 0.7 | 3050 | 1.5 | 1 × 10¹³ | 11 | 2.0 | −10 | −51 | 750 |

(*marked are comparison samples, which are outside the present invention. The additive compositions of CaTiO₃, Ta₂O₅ and La₂O₃ are shown by weight parts of the additives to 100 weight parts of BaTiO₃, and the others MnO₂, Cr₂O₃ etc. are shown by added amount in weight % to host material.)

As is obvious from the Table 3–Table 5, it is observed that also for the compositions of the second embodiments to fourth embodiments, like the first embodiment, the dielectric constant is large, the capacity change depending on AC voltage is small and the bending strength is great.

Hereupon, though in the second through fourth embodiments only such cases have been illustrated that as shown in Table 3 to Table 5 as the additive composition one of MnO₂, Cr₂O₃, Fe₂O₃, NiO or CoO has been included to the host material, but the inventors confirmed that similar effect is obtainable even when two or more of these oxides are combined and included. In that case, it is similar to the above-mentioned case that when the additive amount to the host material is included exceeding 0.5 weight % the characteristic of $\epsilon_{25}$ is deteriorated. Also, the inventors confirmed that by inclusion of 0.01 weight % or more (0.5 weight % or smaller) of at least one kind of oxide of Mn, Cr, Fe, Ni and Co to the host material, the compositions of the above-mentioned second through fourth embodiments have the similar effects as the characteristics shown in Table 3 through Table 5.

Also, compositions of the samples No. 15 of the Table 3, Table 4 and Table 5 are used and the above-mentioned laminated ceramic capacitors were trially made, their characteristics were examined, and the results are shown on the below-mentioned Table 6. In this case the sizes of the element were similar to the embodiment of the first embodiment, and the characteristics were measured under the same conditions.

TABLE 6

|  | C (pF) | tan 6δ (%) | I Re (Ω) | B D Ve (kV) | TC (%) -30° C. | TC (%) +85° C. | Bending Strength (Kg) |
|---|---|---|---|---|---|---|---|
| Second embodiment (Sample No. 15 of Table 3) | 2580 | 0.7 | $1.3 \times 10^{13}$ | 3.2 | −10.5 | −29.8 | 3.5 |
| Third embodiment (Sample No. 15 of Table 4) | 2450 | 0.8 | $9 \times 10^{12}$ | 2.8 | −7.3 | −31.1 | 3.7 |
| Fourth embodiment (Sample No. 15 of Table 5) | 2200 | 0.7 | $9 \times 10^{12}$ | 2.6 | −5.0 | −30.1 | 3.6 |

Figure 3:
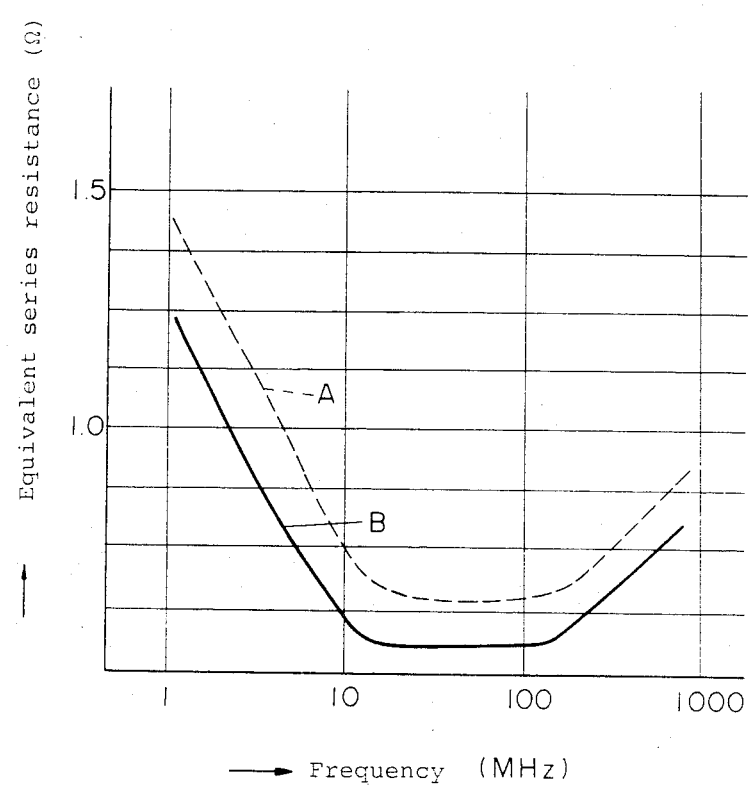
Figure 4:
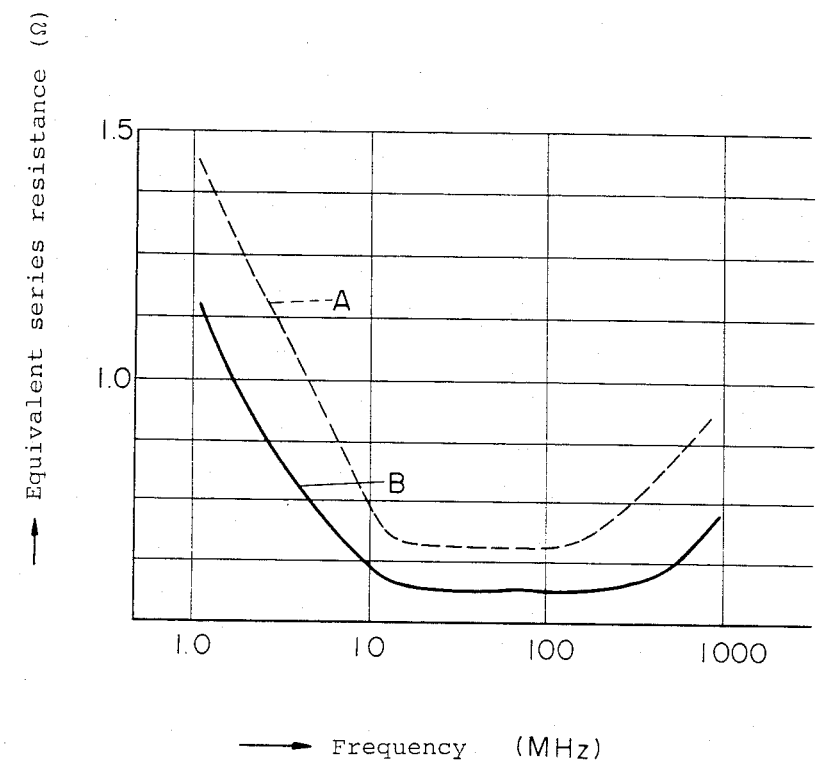
Figure 5:
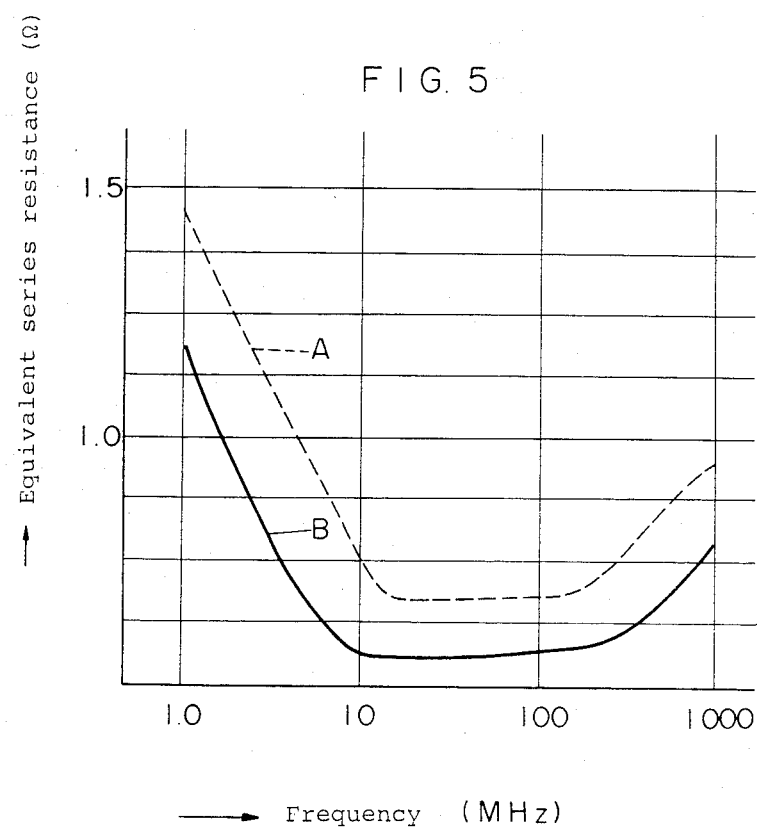
Figure 8:
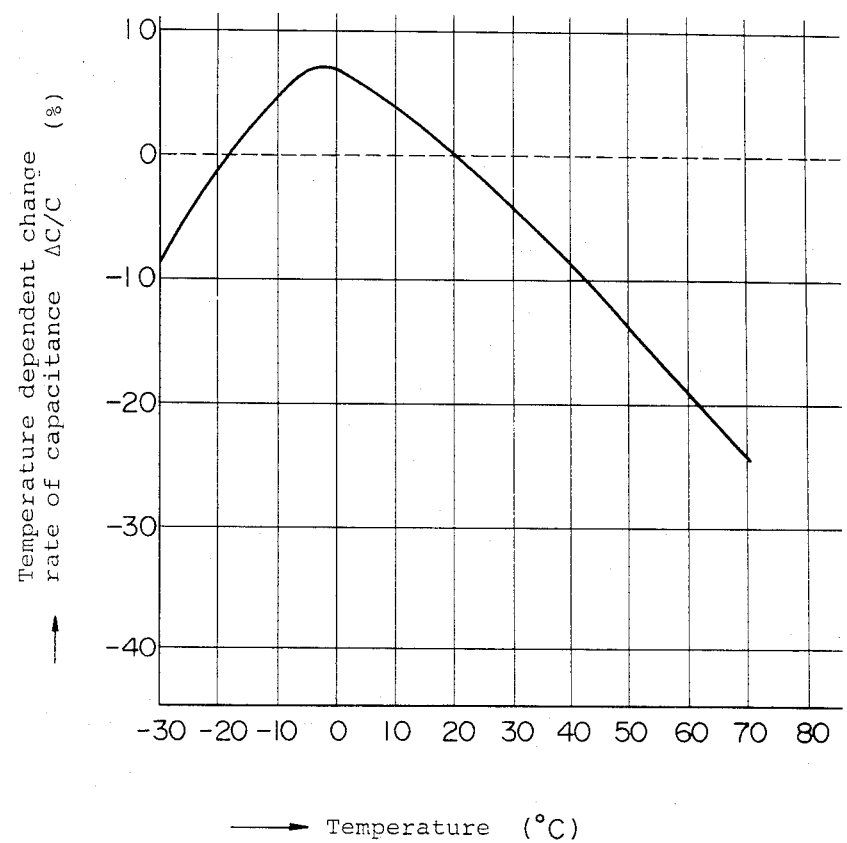
Figure 9:
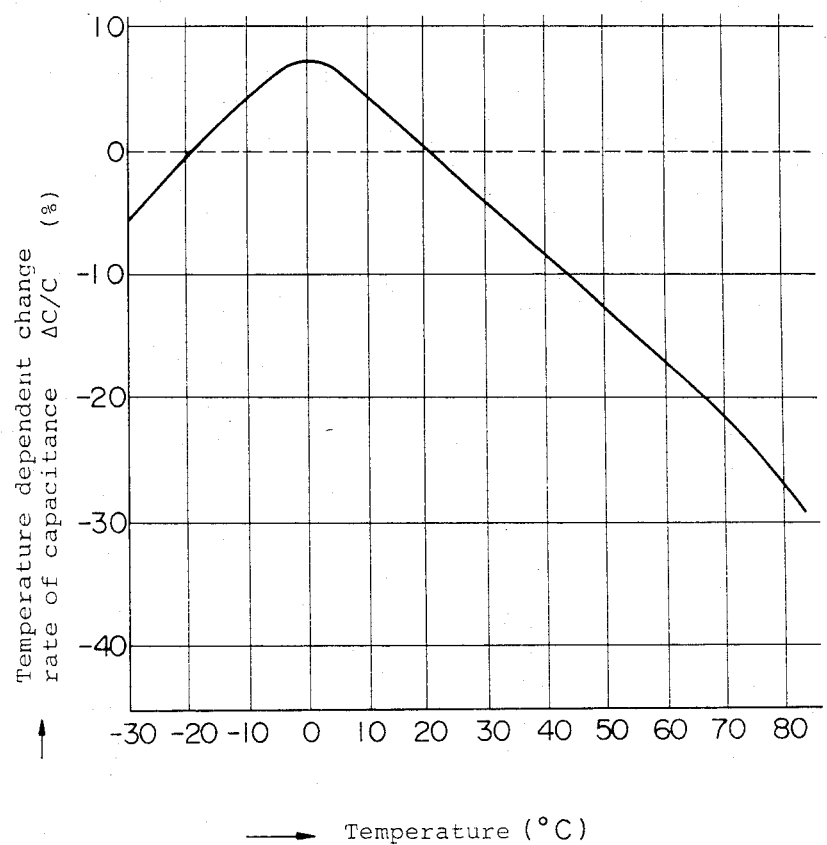

FIG. 3 through FIG. 5 show frequency characteristics of equivalent series resistance of these cases. It is apparent that, in comparison with the characteristic A of the above-mentioned composition (composition for the above-mentioned $BaZrO_3$ additive), the characteristics B of the capacitors trially made with the examples No. 15 of the second embodiment through fourth embodiment is very good in high frequency range like the first embodiment. Besides, FIG. 7 through FIG. 9 show temperature dependent change rates of the capacitance of capacitors trially made with the composition of FIG. 2 through FIG. 4.

POSSIBLE UTILIZATION IN INDUSTRY

As has been explained above, according to the ceramic high dielectric composition of this invention, there are good characteristics when used as thin film type dielectric body such as laminated ceramic capacitor. That is, it has a composition to meet recent market needs having a high dielectric constant of 3000 or above, having a small voltage-dependency, a strong bending strength, a small equivalent series resistance in high frequency, and is well suited as an electronic tuner or the like.

We claim:

1. In a ceramic composition having a high dielectric constant, said ceramic composition containing a host material,
   the improvement in which the host material consists essentially of:
   1-5 parts by weight $CaTiO_3$;
   2-3 parts by weight $Ta_2O_5$;
   up to 0.2 by weight $MnO_2$;
   up to 0.5 by weight $SiO_2$; and
   the remainder is $BaTiO_3$
   wherein each of the aforesaid parts by weight are parts by weight per 100 parts by weight $BaTiO_3$,
   said ceramic composition having a dielectric constant $\xi_{25}$ of at least 3,000 measured at 25° C. with a 1 KHz at 1 VAC, a voltage dependency tan δ not more than 2.0 measured at an effective voltage of 50 V/mm and a bending strength of at least 690 $Kg/cm^2$.

2. In a ceramic composition having a high dielectric constant, said ceramic composition containing a host material,
   the improvement in which the host material consists essentially of:
   1-5 parts by weight $CaTiO_3$;
   1-4 parts by weight $Ta_2O_5$;
   1-4 parts by weight $Gd_2O_3$; and
   the remainder is $BaTiO_3$,
   wherein each of the foresaid parts by weight are parts by weight per 100 parts by weight of $BaTiO_3$,
   said ceramic composition having a dielectric constant $\xi_{25}$ of at least 3,000 measured at 25° C. with a 1 KHz at 1 VAC, a voltage dependency tan δ not more than 2.0 measured at an effective voltage of 50 V/mm and a bending strength of at least 690 $Kg/cm^2$.

3. The ceramic composition of claim 2 which further includes from 0.01 to 0.5 weight percent of at least one oxide of Mn, Cr, Fe, Ni or Co.

4. In a ceramic composition having a high dielectric constant, said ceramic composition containing a host material,
   the improvement in which the host material consists essentially of:
   1-5 parts by weight $CaTiO_3$;
   1-4 parts by weight $Ta_2O_5$;
   1-4 parts by weight $Nd_2O_3$; and
   the remainder is $BaTiO_3$,
   wherein each of the parts by weight are parts by weight per 100 parts by weight $BaTiO_3$,
   said ceramic composition having a dielectric constant $\xi_{25}$ of at least 3,000 measured at 25° C. with a 1 KHz at 1 VAC, a voltage dependency tan δ not more than 2.0 measured at an effective voltage of 50 V/mm and a bending strength of at least 690 $Kg/cm^2$.

5. The ceramic composition of claim 4 which further includes from 0.01 to 0.5 weight percent of at least one oxide of Mn, Cr, Fe, Ni or Co.

6. In a ceramic composition having a high dielectric constant, said ceramic composition containing a host material,
   the improvement in which the host material consists essentially of:
   1-5 parts by weight $CaTiO_3$;
   1-4 parts by weight $Ta_2O_5$;
   1-4 parts by weight $LA_2O_3$; and
   the remainder is $BaTiO_3$,
   wherein each of the aforesaid parts by weight are parts by weight per 100 parts by weight $BaTiO_3$,
   said ceramic composition having a dielectric constant $\xi_{25}$ of at least 3,000 measured at 25° C. with a 1 KHz at 1 VAC, a voltage dependency tan δ not more than 2.0 measured at an effective voltage of 50 V/mm and a bending strength of at least 690 Kg/cm².

7. The ceramic composition of claim 6 which further includes from 0.01 to 0.5 weight percent of at least one oxide of Mn, Cr, Fe, Ni or Co.

8. A ceramic composition having a high dielectric constant and containing BaTiO₃ as host material, the improvement in which the host material consists essentially of:

1–5 parts by weight of CaTiO₃;

2–3 parts by weight of Ta₂O₅; and the remainder of the host material is BaTiO₃, wherein each of the aforesaid parts by weight are parts by weight per 100 parts by weight of BaTiO₃, said ceramic compostion having a dielectric constant $\xi_{25}$ of at least 3,000 measured at 25° C. with a 1 KHz at 1 VAC, a voltage dependency tan δ not more than 2.0 measured at an effective voltage of 50/V/mm and a bending strength of at least 690 Kg/cm².

9. A ceramic capacitor consisting of a ceramic dielectric body formed by the ceramic composition of claim 8 having a plurality of internal electrodes therein and a pair of external electrodes attached to the surface of the dielectric body each external electrode in electrical contact with alternating adjacent inner electrodes.

* * * * *